Sept 15, 1925.
W. E. HEAL
METHOD OF MAKING GLASS PLATES
Filed Sept. 6, 1924
1,553,773
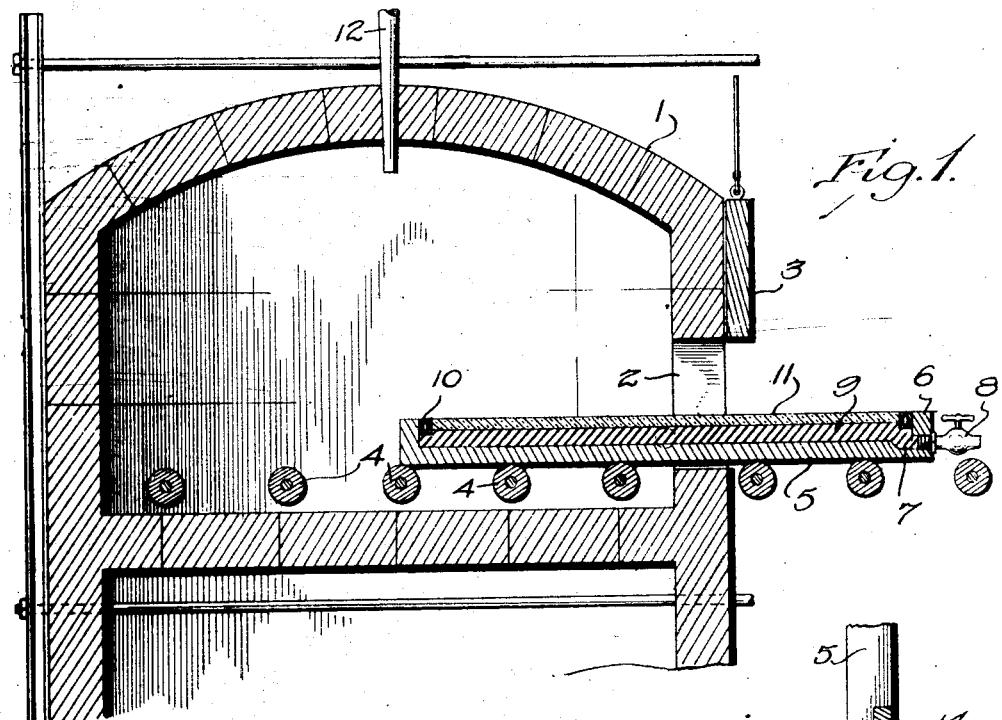
Inventor
WILLIAM E. HEAL
Attorney Patented Sept. 15, 1925.

1,553,773

UNITED STATES PATENT OFFICE.

WILLIAM E. HEAL, OF WASHINGTON, DISTRICT OF COLUMBIA.

METHOD OF MAKING GLASS PLATES.

Application filed September 6, 1924. Serial No. 736,286.

*To all whom it may concern:*

Be it known that I, WILLIAM E. HEAL, a citizen of the United States, residing at Washington, in the District of Columbia, have invented certain new and useful Improvements in Methods of Making Glass Plates, of which the following is a specification.

This invention relates to methods of making plate glass and more particularly to a method of forming glass plates by fusing powdered glass in a layer over a supporting medium in the nature of a layer of metal which has a lower melting point than the glass.

I am aware of previous attempts to form glass plates by the method above outlined wherein a supporting medium such as tin is maintained in a fluid condition in a heated chamber while a layer of molten glass is drawn across the metal, the fluid condition of the metal forming a highly polished surface on the under side of the glass while the fluidity of the glass causes the upper surface thereof to become highly polished. With such an apparatus it has been found that the surface of the molten metal becomes oxidized and causes considerable trouble in operation since it is very difficult to entirely cover the surface of the metal with the glass so as to substantially exclude air.

In my copending application Serial No. 660,575 filed September 1, 1923, I have disclosed a method and apparatus for forming glass plates wherein I provide a supporting tray having a layer of magnesia or quartz arranged therein and a layer of powdered glass is spread evenly over the surface of the quartz whereupon the tray is inserted into a heating chamber to fuse the glass. The magnesia or quartz which forms the supporting medium for the powdered glass obviously has a higher melting point than the glass and the latter is fused without disturbing the solid condition of the supporting medium.

An object of the present invention is to provide a method for forming glass plates which may be carried out in a manner generally similar to that of my copending application above mentioned except that I employ a layer of metal, preferably tin, as the supporting medium for the powdered glass, or previously formed sheet of glass, the metal having a lower melting point than the glass, a very high vaporizing point, and possessing a higher specific gravity than the glass. In the practice of the method I employ a tray in which is placed the supporting medium of metal and the powdered glass or glass sheet is adapted to wholly cover the exposed surface of the metal so that when the latter is melted in the manner to be described oxidation of the surface metal is substantially prevented.

A further object of the invention is to provide a method as above outlined wherein both the powdered glass and the metal supporting medium may be highly heated whereby both will melt, after which the glass, metal, and tray may be cooled to a temperature below the melting point of the glass but above the melting point of the metal supporting medium whereby the latter may be drawn off from the tray and the glass plate removed.

In the accompanying drawings I have shown an organization of apparatus elements particularly adapted for practicing the process and forming a part of the present invention. In this showing—

Figure 1 is a vertical longitudinal sectional view of a forming chamber showing the table or tray being inserted within the chamber, Figure 2 is a vertical longitudinal sectional view of the tray showing a somewhat modified manner of carrying out the method, Figure 3 is a similar view showing a further modification, Figure 4 is a fragmentary perspective of the tray and associated elements showing a plate of glass formed therein, and, Figure 5 is a detail view showing one manner in which the tray may be tilted when withdrawn from the chamber.

Referring to the drawings the numeral 1 designates a heating chamber preferably formed of blocks of fire clay having an opening 2 formed in one wall and adapted to be closed by a vertically movable door 3. The chamber may be heated in any suitable manner for heating the glass which is inserted within the chamber in a manner to be described. A plurality of horizontally alined rollers are provided as shown in Fig. 1 of the drawings, some of the rollers being mounted within the chamber and some outwardly of the chamber, the upper portion of the rollers being arranged slightly above the bottom of the opening 2 as shown in Figure 1.

The numeral 5 designates a tray formed of any suitable material having a very high melting point such as cast iron and the tray is provided with a peripheral upstanding flange 6. The tray is provided preferably at its outer end with a pocket 7 communicating with the lower portion of the interior of the tray and a cock 8 is threaded into the tray to control communication between the pocket 7 and any suitable collecting means for the molten metal therein, to be described. The tray is adapted to contain a layer 9 of molten metal such as tin which has a lower melting point than glass, a very high vaporizing point and a higher specific gravity than glass. The metal preferably fills more than one-half the volume of the interior of the tray 5 and is preferably melted when initially placed in the tray to provide a smooth upper surface. As shown in Figures 1 to 4 inclusive, a hollow ring 10 is placed within the flange 6 and preferably snugly fits the inner walls thereof.

In the practice of the method according to the showing in Figure 1, I place a sheet of glass 11 within the ring 10, the sheet 11 being previously cut to a size corresponding to the inner size of the ring 10 so that it snugly fits therein. The sheet 11 when used in connection with the present method is preferably formed by a method which does not impart the high polish required of high grade glass. The tray containing the metal 9 and glass sheet 11 is inserted into the chamber 1 by rolling over the rollers 4 as shown. The interior of the chamber 1 is highly heated by any suitable means, not shown, and the greater portion of the air therein is exhausted by pumping into the chamber 1, through the pipe 12, an inert gas such as nitrogen. When the tray is positioned wholly within the chamber 1, the door 3 is closed and the tray, metal layer 9 and glass 11 are heated until the glass softens whereupon it assumes a perfectly horizontal position upon the metal 9, which, becomes fluid before the sheet 11 softens. Obviously the metal 9, when melted, presents a perfectly polished upper surface which supports the sheet 11 when the latter is softened so that the lower face thereof becomes highly polished. Obviously the softening of the sheet 11 highly polishes the upper surface thereof whereupon it assumes a high polish required of high grade plate glass. When the above operation has been completed the tray 5 is withdrawn from the heating chamber and tilted to a vertical position in any suitable manner whereupon the molten metal 9 is drawn off through the cock 8 into any suitable collecting receptacle.

It will be obvious that the fusing of the sheet 11 causes it to adhere to the ring 10 and after the molten metal has been drawn off the ring 10 may be removed from the tray whereupon the plate 11 may be removed from the ring in any suitable manner.

For the sake of illustration I have shown the tray 5 provided preferably centrally thereof with trunnions 13 which may engage supporting members 14 arranged outwardly of the heating chamber after the tray has been moved outwardy from the chamber. It will be obvious that the trunnions 13 may engage arcuate cut-out portions in the supporting members 14 whereupon the tray may be tilted to assume the previously described vertical position to permit the molten metal to be drawn off.

In Figure 2 of the drawings I have shown a somewhat modified manner of carrying out the method wherein I spread a layer of powdered glass 16 evenly upon the surface of the metal 9. The tray containing the metal and powdered glass 16 is inserted into the heating chamber in the manner previously described and is heated until the metal becomes fluid and the glass fuses forming a sheet which will have highly polished upper and lower faces. The tray is withdrawn from the chamber in the manner previously described and the temperature of the tray, metal and glass is reduced to a point below the melting point of the glass but above that of the metal whereupon the latter may be drawn off while the tray is in a vertical position and the ring 6 may be removed with the sheet of glass therein.

In Figure 3 of the drawings I have shown a method whereby relatively thin sheets of glass may be increased in thickness and the opposite sides of the thickened sheet or plate highly polished to provide a high grade glass plate. In this modified method I place a relatively thin sheet of lower grade previously formed glass 17 within the ring 10 and cover it evenly with a layer of powdered glass 18. The tray is then inserted within the furnace and the above described operation carried out whereupon the lower glass sheet 17 will soften sufficiently to become highly polished by the fluid metal while the powdered glass 18 will fuse and unite with the sheet 17, the fluidity of the powdered glass 18 causing the upper surface thereof to assume a high polish. The tray is then removed from the chamber and the plate of glass removed in the manner previously described.

It will be obvious that in the practice of the methods above outlined, the surface of the metal will be wholly covered to substantially exclude air while the metal is in a molten condition whereby oxidation of the surface of the metal is substantially prevented. If desired, however, the prevention of oxidation may be insured by the introduction of inert gas such as nitrogen through the pipe 12 while the operation is being carried out and the metal is in a molten condition.

It will be obvious that in the practice of the method as outlined in Figure 2, I may employ patterns as shown in my copending application Serial No. 660,575, for making cathedral or so called "stained" glass by forming the layer of powdered glass in the manner described in the copending application.

It will be obvious that the glass plate formed by either of the previously described methods may be placed in a leer and properly annealed in the usual manner.

While I have described in detail the preferred practice of my methods, it is to be understood that the details of procedure of the methods may be widely varied without departing from the spirit of the invention or the scope of the subjoined claims.

Having described my invention, I claim:

1. The herein described method of making glass plates which consists in placing a layer of glass on the upper surface of a substantially horizontal supporting medium having a lower fusing point than that of the glass, and heating the glass and supporting medium to a temperature at least as high as the fusing temperature of the glass.

2. The herein described method of making glass plates which consists in placing a layer of glass on the upper surface of a substantially horizontal supporting medium having a lower fusing point than that of the glass, heating the glass and supporting medium to a temperature at least as high as the fusing point of the glass, cooling the glass to a point below its fusing temperature but above the fusing temperature of the supporting medium, and removing said supporting medium from beneath the glass in a fluid condition.

3. The herein described method of making glass plates which consists in placing a layer of powdered glass on the upper surface of a substantially horizontal supporting medium having a lower fusing point than that of the glass, and heating the glass and supporting medium in the presence of an inert gas to a temperature at least as high as the fusing temperature of the glass.

4. The herein described method of making glass plates which consists in placing a layer of glass on and substantially covering the upper surface of a substantially horizontal metallic supporting medium having a lower fusing point and higher specific gravity than the glass, and heating the glass and supporting medium to a temperature at least as high as the fusing temperature of the glass.

5. The herein described method of making glass plates which consists in placing a layer of glass on and substantially covering the upper surface of a substantially horizontal metallic supporting medium having a lower fusing point and higher specific gravity than the glass, heating the glass and supporting medium to a temperature at least as high as the fusing temperature of the glass, cooling the glass to a point below its fusing temperature but above that of the supporting medium, and removing said supporting medium from beneath the glass in a fluid condition.

6. The herein described method of making glass plates which consists in placing a confining ring on the upper surface of a substantially horizontal supporting medium, placing a layer of glass on said supporting medium and substantially filling the space within said ring, the glass having a fusing point intermediate the fusing points of said ring and supporting medium, heating said ring, glass and supporting medium to a temperature lower than the fusing point of said ring but at least as high as the fusing point of the glass, cooling the glass to a temperature definitely below its fusing point, removing said supporting medium from beneath said glass in a fluid condition, and removing the glass from said ring.

7. The herein described method of making glass plates which consists in placing a layer of powdered glass on and substantially covering the upper surface of a supporting medium having a lower fusing point than the glass, heating the glass and supporting medium to a temperature sufficiently high to render the glass highly fluid, cooling the glass to a temperature below its fusing point to set it, and removing said supporting medium from beneath the glass in a fluid condition.

In testimony whereof I affix my signature.

WILLIAM E. HEAL.